United States Patent
Stawovy

(10) Patent No.: US 11,919,070 B2
(45) Date of Patent: *Mar. 5, 2024

(54) FABRICATION OF METALLIC PARTS BY ADDITIVE MANUFACTURING

(71) Applicant: Michael T. Stawovy, Cleveland Heights, OH (US)

(72) Inventor: Michael T. Stawovy, Cleveland Heights, OH (US)

(73) Assignee: H.C. STARCK SOLUTIONS COLDWATER, LLC, Coldwater, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,748

(22) Filed: Dec. 19, 2022

(65) Prior Publication Data

US 2023/0121858 A1 Apr. 20, 2023

Related U.S. Application Data

(63) Continuation of application No. 16/902,827, filed on Jun. 16, 2020, now Pat. No. 11,554,397, which is a
(Continued)

(51) Int. Cl.
*B22D 7/00* (2006.01)
*B21C 1/02* (2006.01)
(Continued)

(52) U.S. Cl.
CPC ............. *B22D 7/005* (2013.01); *B21C 1/02* (2013.01); *B22F 3/02* (2013.01); *B22F 3/24* (2013.01);
(Continued)

(58) Field of Classification Search
CPC ...... B22F 2301/20; B22F 10/20; B22F 10/00; B22F 5/12; B22F 3/24; B22F 3/02; B22F 10/38; B22F 10/25; B23K 2103/08; B23K 15/0093; B23K 15/0086; B23K 9/295; B23K 9/24; B23K 9/044; Y02P 10/25; F27D 11/08; C22C 27/04; B32B 15/01;
(Continued)

(56) References Cited

U.S. PATENT DOCUMENTS 2,191,470 A * 2/1940 Hopkins ................ B23K 9/038
29/527.4
3,277,557 A * 10/1966 Ham ....................... C23C 10/28
72/275
(Continued)

FOREIGN PATENT DOCUMENTS

| JP | 61110755 | 5/1986 |
| JP | 63166952 | 7/1988 |
| JP | 07-118773 A | 5/1995 |

OTHER PUBLICATIONS

International Search Report and Written Opinion, International Application No. PCT/US2017/020151, dated May 10, 2017, 31 pages.

*Primary Examiner* — Jimmy Chou
(74) *Attorney, Agent, or Firm* — Morgan, Lewis & Bockius LLP

(57) ABSTRACT

In various embodiments, wire composed at least partially of arc-melted refractory metal material is utilized to fabricate three-dimensional parts by additive manufacturing.

17 Claims, 8 Drawing Sheets

Related U.S. Application Data continuation of application No. 15/446,489, filed on Mar. 1, 2017, now Pat. No. 10,730,089.

(60) Provisional application No. 62/302,847, filed on Mar. 3, 2016.

(51) Int. Cl.

| | | |
|---|---|---|
| *B22F 3/02* | (2006.01) | |
| *B22F 3/24* | (2006.01) | |
| *B22F 5/12* | (2006.01) | |
| *B22F 10/25* | (2021.01) | |
| *B22F 10/38* | (2021.01) | |
| *B23K 9/04* | (2006.01) | |
| *B23K 9/24* | (2006.01) | |
| *B23K 9/29* | (2006.01) | |
| *B23K 15/00* | (2006.01) | |
| *B32B 15/01* | (2006.01) | |
| *B33Y 10/00* | (2015.01) | |
| *B33Y 70/00* | (2020.01) | |
| *B33Y 80/00* | (2015.01) | |
| *C22C 27/04* | (2006.01) | |
| *F27D 11/08* | (2006.01) | |
| *B22F 10/00* | (2021.01) | |
| *B22F 10/20* | (2021.01) | |
| *B23K 103/08* | (2006.01) | |

(52) U.S. Cl.
CPC .............. *B22F 5/12* (2013.01); *B22F 10/25* (2021.01); *B22F 10/38* (2021.01); *B23K 9/044* (2013.01); *B23K 9/24* (2013.01); *B23K 9/295* (2013.01); *B23K 15/0086* (2013.01); *B23K 15/0093* (2013.01); *B32B 15/01* (2013.01); *B33Y 10/00* (2014.12); *B33Y 70/00* (2014.12); *B33Y 80/00* (2014.12); *C22C 27/04* (2013.01); *F27D 11/08* (2013.01); *B22F 10/00* (2021.01); *B22F 10/20* (2021.01); *B22F 2301/20* (2013.01); *B23K 2103/08* (2018.08); *Y02P 10/25* (2015.11)

(58) Field of Classification Search
CPC ........... B21C 1/02; B33Y 80/00; B33Y 70/00; B33Y 10/00; B22D 7/005
USPC ...................................................... 219/76.14
See application file for complete search history.

(56) References Cited

U.S. PATENT DOCUMENTS

| | | | | |
|---|---|---|---|---|
| 3,540,114 A * | 11/1970 | Martin | ............... | B21C 37/047 72/274 |
| 3,811,846 A * | 5/1974 | Schoerner | ............... | H01B 1/023 148/439 |
| 3,837,066 A | 9/1974 | Mori | | |
| 4,112,197 A | 9/1978 | Metz | | |
| 4,156,500 A * | 5/1979 | Yoshida | ............... | B21C 37/042 228/156 |
| 4,178,985 A * | 12/1979 | Sauvage | ............... | B22D 11/005 164/505 |
| 4,209,122 A * | 6/1980 | Hunt | ............... | B21C 37/047 29/423 |
| 4,223,434 A * | 9/1980 | Wang | ............... | H10N 60/0184 419/24 |
| 4,224,735 A | 9/1980 | Young | | |
| 4,323,186 A * | 4/1982 | Hunt | ............... | B21C 37/047 29/423 |
| 4,411,712 A * | 10/1983 | Marancik | ............... | H10N 60/0184 29/599 |
| 4,791,241 A | 12/1988 | Ando | | |
| 5,106,701 A * | 4/1992 | Kurosaka | ............... | H01B 1/026 148/684 |
| 5,525,423 A * | 6/1996 | Liberman | ............... | B21C 23/30 428/397 |
| 5,890,272 A * | 4/1999 | Liberman | ............... | B21C 37/042 29/423 |
| 5,989,364 A * | 11/1999 | Kitamura | ............... | C22C 5/02 257/E23.025 |
| 6,112,395 A * | 9/2000 | Quick | ............... | B22F 1/062 29/423 |
| 6,322,857 B1 * | 11/2001 | Kretschmer | ............... | C23C 4/08 427/451 |
| 6,324,746 B1 * | 12/2001 | Bruzek | ............... | H10N 60/20 29/599 |
| 6,328,927 B1 * | 12/2001 | Lo | ............... | C22C 1/045 419/45 |
| 6,687,284 B1 * | 2/2004 | Beauregard | ............... | H05B 7/144 373/102 |
| 6,884,959 B2 * | 4/2005 | Gandy | ............... | B23K 9/188 219/76.14 |
| 7,073,561 B1 * | 7/2006 | Henn | ............... | B22F 10/40 164/94 |
| 7,168,935 B1 * | 1/2007 | Taminger | ............... | B23K 15/0073 264/408 |
| 7,767,564 B2 * | 8/2010 | Dutta | ............... | H01L 29/42392 136/238 |
| 7,841,507 B2 * | 11/2010 | Kempa | ............... | B23K 9/173 228/171 |
| 7,972,448 B2 | 7/2011 | Reppel | | |
| 8,546,717 B2 * | 10/2013 | Stecker | ............... | B22F 12/38 219/121.13 |
| 8,794,540 B2 * | 8/2014 | Margolies | ............... | C23C 4/131 239/81 |
| 10,099,267 B2 * | 10/2018 | Stawovy | ............... | C22C 27/04 |
| 10,300,531 B2 * | 5/2019 | Swank | ............... | B21C 33/004 |
| 11,554,397 B2 * | 1/2023 | Stawovy | ............... | B33Y 80/00 |
| 2001/0008230 A1 * | 7/2001 | Keicher | ............... | B22F 10/73 219/121.84 |
| 2001/0029659 A1 * | 10/2001 | Asao | ............... | C22B 15/006 29/527.6 |
| 2002/0007546 A1 | 1/2002 | Quick | | |
| 2002/0017507 A1 * | 2/2002 | North | ............... | C23C 4/18 219/121.45 |
| 2003/0075836 A1 * | 4/2003 | Fong | ............... | B33Y 40/00 264/401 |
| 2003/0136774 A1 * | 7/2003 | Nikodym | ............... | B23K 35/368 219/137 WM |
| 2005/0044687 A1 * | 3/2005 | Matsuguchi | ............... | B21C 37/042 29/455.1 |
| 2005/0142021 A1 * | 6/2005 | Aimone | ............... | B22F 5/00 75/346 |
| 2005/0199321 A1 * | 9/2005 | Spaniol | ............... | H01G 9/0525 148/668 |
| 2006/0006157 A1 * | 1/2006 | Oldani | ............... | B33Y 30/00 219/121.64 |
| 2007/0051702 A1 * | 3/2007 | James | ............... | B23K 35/0255 219/73 |
| 2007/0175543 A1 * | 8/2007 | Miyazaki | ............... | H10N 60/0184 148/98 |
| 2008/0011727 A1 * | 1/2008 | Peters | ............... | B23K 9/1043 219/125.1 |
| 2008/0264924 A1 * | 10/2008 | Duncan | ............... | B23K 35/0266 219/145.1 |
| 2009/0011942 A1 | 1/2009 | Lee | | |
| 2009/0078689 A1 * | 3/2009 | Brass | ............... | B23K 9/324 219/162 |
| 2009/0176650 A1 | 7/2009 | Miyatake | | |
| 2009/0278419 A1 * | 11/2009 | Teale | ............... | B23K 9/0026 29/598 |
| 2009/0312187 A1 * | 12/2009 | Seido | ............... | H10N 60/0156 29/599 |
| 2010/0031493 A1 | 2/2010 | Motowidlo | | |
| 2010/0084388 A1 * | 4/2010 | Gerth | ............... | B23K 35/0266 29/746 |
| 2010/0112374 A1 * | 5/2010 | Knauf | ............... | B23K 35/327 428/615 |

(56) References Cited

U.S. PATENT DOCUMENTS

| | | | | |
|---|---|---|---|---|
| 2010/0147818 A1* | 6/2010 | Fondriest | ............ | B23K 9/0026 |
| | | | | 219/137 WM |
| 2010/0317530 A1 | 12/2010 | Park | | |
| 2011/0061591 A1* | 3/2011 | Stecker | ................. | B33Y 40/00 |
| | | | | 118/663 |
| 2011/0114839 A1* | 5/2011 | Stecker | ................. | H01J 37/304 |
| | | | | 250/307 |
| 2011/0240607 A1* | 10/2011 | Stecker | ................. | B23K 15/06 |
| | | | | 219/121.16 |
| 2012/0190555 A1* | 7/2012 | Sasaoka | ............ | H10N 60/0128 |
| | | | | 505/433 |
| 2012/0193335 A1* | 8/2012 | Guldberg | ........... | B23K 15/0093 |
| | | | | 219/136 |
| 2012/0217060 A1 | 8/2012 | Kusakari | | |
| 2012/0234814 A1* | 9/2012 | Tseng | ................. | B23K 35/362 |
| | | | | 219/145.23 |
| 2013/0053250 A1 | 2/2013 | Ohata | | |
| 2014/0009872 A1* | 1/2014 | Prest | ...................... | C22C 38/54 |
| | | | | 361/679.01 |
| 2014/0014629 A1* | 1/2014 | Stecker | ................. | B22F 12/90 |
| | | | | 219/76.14 |
| 2014/0061165 A1* | 3/2014 | Stempfer | ................. | C22C 14/00 |
| | | | | 219/76.16 |
| 2014/0124483 A1* | 5/2014 | Henn | ................. | B23K 26/342 |
| | | | | 219/76.1 |
| 2014/0263196 A1* | 9/2014 | Daum | ................. | B23K 26/342 |
| | | | | 219/76.14 |
| 2014/0263246 A1* | 9/2014 | Brice | .................... | B23K 15/06 |
| | | | | 427/595 |
| 2014/0263259 A1* | 9/2014 | Narayanan | ........... | B23K 35/362 |
| | | | | 219/145.22 |
| 2015/0021815 A1* | 1/2015 | Albrecht | ................ | B23K 31/12 |
| | | | | 425/162 |
| 2015/0027993 A1* | 1/2015 | Bruck | .................. | B23K 35/362 |
| | | | | 148/26 |
| 2015/0108096 A1* | 4/2015 | Daniel | ................ | B23K 9/0956 |
| | | | | 219/76.12 |
| 2015/0209889 A1* | 7/2015 | Peters | .................... | B22F 10/22 |
| | | | | 219/76.14 |
| 2015/0209905 A1* | 7/2015 | Matthews | .............. | B23K 9/173 |
| | | | | 219/76.14 |
| 2015/0209906 A1* | 7/2015 | Denney | ................ | B23K 26/342 |
| | | | | 219/76.14 |
| 2015/0209907 A1* | 7/2015 | Narayanan | ............. | B23K 9/173 |
| | | | | 219/76.14 |
| 2015/0209908 A1* | 7/2015 | Peters | .................... | B23K 26/34 |
| | | | | 219/76.14 |
| 2015/0258626 A1* | 9/2015 | Seufzer | ............. | B23K 15/0013 |
| | | | | 219/121.15 |
| 2015/0275687 A1* | 10/2015 | Bruck | .................... | B29P 6/007 |
| | | | | 277/630 |
| 2015/0328719 A1* | 11/2015 | Jarvis | .................. | B23K 1/0053 |
| | | | | 219/76.12 |
| 2015/0352794 A1* | 12/2015 | Nguyen | ................. | B22F 10/25 |
| | | | | 700/98 |
| 2016/0144441 A1* | 5/2016 | Bruck | ............ | B23K 35/0272 |
| | | | | 219/75 |
| 2016/0318130 A1* | 11/2016 | Stempfer | ............... | B33Y 30/00 |
| 2017/0050261 A1* | 2/2017 | Li | ........................... | B22F 10/28 |
| 2017/0225261 A1* | 8/2017 | Swank | ................... | B23K 11/30 |
| 2017/0252787 A1* | 9/2017 | Stawovy | ................. | B22D 7/005 |
| 2017/0252846 A1 | 9/2017 | Stawovy | | |
| 2018/0272460 A1* | 9/2018 | Nelson | .................... | B22F 10/25 |
| 2020/0198061 A1* | 6/2020 | Moon | ....................... | B21C 1/02 |

\* cited by examiner

FABRICATION OF METALLIC PARTS BY ADDITIVE MANUFACTURING

RELATED APPLICATIONS

This application is a continuation of U.S. patent application Ser. No. 16/902,827, filed Jun. 16, 2020, which is a continuation of U.S. patent application Ser. No. 15/446,489, filed Mar. 1, 2017, which claims the benefit of and priority to U.S. Provisional Patent Application No. 62/302,847, filed Mar. 3, 2016, the entire disclosure of each of which is hereby incorporated herein by reference.

TECHNICAL FIELD

In various embodiments, the present invention relates to the formation of metallic parts via additive manufacturing techniques.

BACKGROUND

Additive manufacturing, or three-dimensional (3D) printing, is a widely utilized technique for rapid manufacturing and rapid prototyping. In general, additive manufacturing entails the layer-by-layer deposition of material by computer control to form a three-dimensional object. Most additive manufacturing techniques to date have utilized polymeric or plastic materials as raw materials, as such materials are easily handled and melt at low temperatures. Since additive manufacturing involves the melting of only small amounts of material at a time, the process has the potential to be a useful technique for the fabrication of large, complex structures composed of metal as well. Unfortunately, additive manufacturing of metallic materials is not without its challenges. When fabricating a three-dimensional part with a metallic precursor material via additive manufacturing, the melting of the precursor material may result in sparking, blistering, and splattering (i.e., ejection of small pieces of the precursor material itself). In addition, even if the three-dimensional part is successfully fabricated utilizing conventional precursor materials, the part may exhibit excessive porosity, cracking, material splatter, and insufficient density and machinability.

In view of the foregoing, there is a need for improved precursor materials for the additive manufacturing of metallic parts.

SUMMARY

In accordance with various embodiments of the present invention, wires for use as feedstock for additive manufacturing processes are fabricated such that the amounts of gaseous and/or volatile impurities therein are reduced or minimized. As utilized herein, the term "volatile elements" refers to elements having boiling points lower than the melting point of the nominal, majority wire material. For example, the concentrations of elements such as oxygen (O), sodium (Na), magnesium (Mg), phosphorus (P), sulfur (S), potassium (K), calcium (Ca), and antimony (Sb) may be kept below a concentration of 20 ppm, below a concentration of 10 ppm, below a concentration of 5 ppm, below a concentration of 3 ppm, below a concentration of 2 ppm, or even below a concentration of 1 ppm (all concentrations herein are by weight unless otherwise indicated), and one or more, or even all, of these elements may be volatile elements in various embodiments of the present invention. The precursor wire itself may include, consist essentially of, or consist of one or more refractory metals, e.g., niobium (Nb), tantalum (Ta), rhenium (Re), tungsten (W), and/or molybdenum (Mo). The wire may be utilized in an additive manufacturing process to form a three-dimensional part, e.g., a refractory crucible.

In various embodiments of the invention, the precursor wire is fabricated, at least partially, via arc melting in a vacuum or a substantially inert ambient. The arc-melting process advantageously minimizes or reduces the concentration of volatile impurities within the wire, thereby enabling successful additive manufacturing processes utilizing the wire. The resulting wire is utilized in an additive manufacturing process to form a three-dimensional part composed, at least partially, of the precursor material. In exemplary embodiments, the wire is fed toward a movable platform, and the tip of the wire is melted by, e.g., an electron beam or a laser. The platform (and/or the wire) moves such that the molten wire traces out the pattern of a substantially two-dimensional slice of the final part; in this manner, the final part is fabricated in layer-by-layer fashion via melting and rapid solidification of the wire. In such additive manufacturing processes, the wire is successfully melted during formation of the three-dimensional part with minimal (if any) sparking, blistering, and/or splattering. In addition, the finished part exhibits a high density (e.g., greater than 96%, greater than 97%, greater than 98%, or even greater than 99% of the theoretical density) without the porosity or cracking that may accompany use of conventional powder metallurgy feedstock materials, particularly those for refractory metals.

Wire in accordance with embodiments of the invention may also be utilized in a variety of different wire-fed welding applications (e.g., MIG welding, welding repair) in which an electric arc is struck between the wire and a workpiece, causing part of the wire to fuse with the workpiece.

In an aspect, embodiments of the invention feature a method of fabricating a three-dimensional part that includes, consists essentially of, or consists of molybdenum. In a step (a), powder is compacted to form a feed electrode. The powder includes, consists essentially of, or consists of molybdenum. In a step (b), the feed electrode is arc-melted in a processing ambient including, consisting essentially of, or consisting of a vacuum or one or more inert gases, thereby forming a billet. In a step (c), the billet is mechanically deformed into wire having a diameter (or other dimension, e.g., width) less than a diameter (or other dimension, e.g., width) of the billet. In a step (d), a tip of the wire is translated relative to a platform (i.e., all or a portion of the wire is translated, the platform is translated, or both). In a step (e), while the tip of the wire is being translated, the tip of the wire is melted with an energy source to form a molten bead, whereby the bead cools to form at least a portion of a layer of a three-dimensional part. In a step (f), steps (d) and (e) are repeated one or more times to produce the three-dimensional part (or at least a portion thereof). The three-dimensional part includes, consists essentially of, or consists of molybdenum.

Embodiments of the invention may include one or more of the following in any of a variety of combinations. A concentration within the wire of sodium, calcium, antimony, magnesium, phosphorous, and/or potassium may be less than 5 ppm by weight, less than 4 ppm by weight, less than 3 ppm by weight, less than 2 ppm by weight, or less than 1 ppm by weight. A concentration within the wire of sodium, calcium, antimony, magnesium, phosphorous, and/or potassium may be no less than 0.001 ppm by weight, no less than 0.005 ppm by weight, no less than 0.01 ppm by weight, no less than 0.05 ppm by weight, no less than 0.1 ppm by weight, or no less than 0.5 ppm by weight. A concentration of oxygen within the wire may be less than 25 ppm by weight, less than 22 ppm by weight, less than 20 ppm by weight, less than 19 ppm by weight, less than 18 ppm by weight, less than 15 ppm by weight, or less than 10 ppm by weight. A concentration of oxygen within the wire may be no less than 0.001 ppm by weight, no less than 0.005 ppm by weight, no less than 0.01 ppm by weight, no less than 0.05 ppm by weight, no less than 0.1 ppm by weight, no less than 0.5 ppm by weight, no less than 1 ppm by weight, or no less than 2 ppm by weight. The density of at least a portion of the three-dimensional part may be greater than 97% of a theoretical density of molybdenum, greater than 98% of a theoretical density of molybdenum, greater than 99% of a theoretical density of molybdenum, or greater than 99.5% of a theoretical density of molybdenum. The density of at least a portion of the three-dimensional part may be no greater than 100% of a theoretical density of molybdenum, no greater than 99.9% of a theoretical density of molybdenum, or no greater than 99.8% of a theoretical density of molybdenum. Step (c) may include, consist essentially of, or consist of drawing, rolling, swaging, extruding, and/or pilgering. Step (a) may include sintering the compacted powder at a temperature greater than 900° C., greater than 950° C., greater than 1000° C., greater than 1100° C., or greater than 1200° C. Step (a) may include sintering the compacted powder at a temperature less than 2500° C. In step (e), the energy source may include, consist essentially of, or consist of an electron beam and/or a laser beam. Prior to step (a), the powder may be provided by a process including, consisting essentially of, or consisting of plasma densification and/or plasma atomization. Prior to step (a), the powder may be provided by a process including, consisting essentially of, or consisting of (i) hydrogenating metal to form a metal hydride, (ii) mechanically grinding the metal hydride into a plurality of particles, and (iii) dehydrogenating the metal hydride particles. Embodiments of the invention include three-dimensional objects or parts fabricated according to any of the above methods.

In another aspect, embodiments of the invention feature a method of fabricating a three-dimensional part utilizing wire. The part includes, consists essentially of, or consists of molybdenum. The wire is produced by a process including, consisting essentially of, or consisting of (i) compacting powder to form a feed electrode, the powder including, consisting essentially of, or consisting of molybdenum, (ii) arc-melting the feed electrode in a processing ambient including, consisting essentially of, or consisting of a vacuum or one or more inert gases, thereby forming a billet, and (iii) mechanically deforming the billet into wire having a diameter (or other dimension, e.g., width) less than a diameter (or other dimension, e.g., width) of the billet. In a step (a), a tip of the wire is translated relative to a platform (i.e., all or a portion of the wire is translated, the platform is translated, or both). In a step (b), while the tip of the wire is being translated, the tip of the wire is melted with an energy source to form a molten bead, whereby the bead cools to form at least a portion of a layer of a three-dimensional part. In a step (c), steps (a) and (b) are repeated one or more times to produce at least a portion of the three-dimensional part. The three-dimensional part includes, consists essentially of, or consists of molybdenum.

Embodiments of the invention may include one or more of the following in any of a variety of combinations. A concentration within the wire of sodium, calcium, antimony, magnesium, phosphorous, and/or potassium may be less than 5 ppm by weight, less than 4 ppm by weight, less than 3 ppm by weight, less than 2 ppm by weight, or less than 1 ppm by weight. A concentration within the wire of sodium, calcium, antimony, magnesium, phosphorous, and/or potassium may be no less than 0.001 ppm by weight, no less than 0.005 ppm by weight, no less than 0.01 ppm by weight, no less than 0.05 ppm by weight, no less than 0.1 ppm by weight, or no less than 0.5 ppm by weight. A concentration of oxygen within the wire may be less than 25 ppm by weight, less than 22 ppm by weight, less than 20 ppm by weight, less than 19 ppm by weight, less than 18 ppm by weight, less than 15 ppm by weight, or less than 10 ppm by weight. A concentration of oxygen within the wire may be no less than 0.001 ppm by weight, no less than 0.005 ppm by weight, no less than 0.01 ppm by weight, no less than 0.05 ppm by weight, no less than 0.1 ppm by weight, no less than 0.5 ppm by weight, no less than 1 ppm by weight, or no less than 2 ppm by weight. The density of at least a portion of the three-dimensional part may be greater than 97% of a theoretical density of molybdenum, greater than 98% of a theoretical density of molybdenum, greater than 99% of a theoretical density of molybdenum, or greater than 99.5% of a theoretical density of molybdenum. The density of at least a portion of the three-dimensional part may be no greater than 100% of a theoretical density of molybdenum, no greater than 99.9% of a theoretical density of molybdenum, or no greater than 99.8% of a theoretical density of molybdenum. Mechanically deforming the billet into wire may include, consist essentially of, or consist of drawing, rolling, swaging, extruding, and/or pilgering. The process of producing the wire may include sintering the compacted powder at a temperature greater than 900° C., greater than 950° C., greater than 1000° C., greater than 1100° C., or greater than 1200° C. The process of producing the wire may include sintering the compacted powder at a temperature less than 2500° C. In step (b), the energy source may include, consist essentially of, or consist of an electron beam and/or a laser beam. The process of producing the wire may include providing the powder by a process including, consisting essentially of, or consisting of plasma densification and/or plasma atomization. The process of producing the wire may include providing the powder by a process including, consisting essentially of, or consisting of (i) hydrogenating metal to form a metal hydride, (ii) mechanically grinding the metal hydride into a plurality of particles, and (iii) dehydrogenating the metal hydride particles. Embodiments of the invention include three-dimensional objects or parts fabricated according to any of the above methods.

In yet another aspect, embodiments of the invention feature a method of fabricating a three-dimensional part that includes, consists essentially of, or consists of molybdenum. In a step (a), a wire including, consisting essentially of, or consisting of arc-melted molybdenum is provided. In a step (b), a tip of the wire is translated relative to a platform (i.e., all or a portion of the wire is translated, the platform is translated, or both). In a step (c), while the tip of the wire is being translated, the tip of the wire is melted with an energy source to form a molten bead, whereby the bead cools to form at least a portion of a layer of a three-dimensional part. In a step (d), steps (b) and (c) are repeated one or more times to produce at least a portion of the three-dimensional part. The three-dimensional part includes, consists essentially of, or consists of molybdenum.

Embodiments of the invention may include one or more of the following in any of a variety of combinations. A concentration within the wire of sodium, calcium, antimony, magnesium, phosphorous, and/or potassium may be less than 5 ppm by weight, less than 4 ppm by weight, less than 3 ppm by weight, less than 2 ppm by weight, or less than 1 ppm by weight. A concentration within the wire of sodium, calcium, antimony, magnesium, phosphorous, and/or potassium may be no less than 0.001 ppm by weight, no less than 0.005 ppm by weight, no less than 0.01 ppm by weight, no less than 0.05 ppm by weight, no less than 0.1 ppm by weight, or no less than 0.5 ppm by weight. A concentration of oxygen within the wire may be less than 25 ppm by weight, less than 22 ppm by weight, less than 20 ppm by weight, less than 19 ppm by weight, less than 18 ppm by weight, less than 15 ppm by weight, or less than 10 ppm by weight. A concentration of oxygen within the wire may be no less than 0.001 ppm by weight, no less than 0.005 ppm by weight, no less than 0.01 ppm by weight, no less than 0.05 ppm by weight, no less than 0.1 ppm by weight, no less than 0.5 ppm by weight, no less than 1 ppm by weight, or no less than 2 ppm by weight. The density of at least a portion of the three-dimensional part may be greater than 97% of a theoretical density of molybdenum, greater than 98% of a theoretical density of molybdenum, greater than 99% of a theoretical density of molybdenum, or greater than 99.5% of a theoretical density of molybdenum. The density of at least a portion of the three-dimensional part may be no greater than 100% of a theoretical density of molybdenum, no greater than 99.9% of a theoretical density of molybdenum, or no greater than 99.8% of a theoretical density of molybdenum. In step (c), the energy source may include, consist essentially of, or consist of an electron beam and/or a laser beam. The process of producing the wire may include, consist essentially of, or consist of (i) compacting powder to form a feed electrode, the powder including, consisting essentially of, or consisting of molybdenum, (ii) arc-melting the feed electrode in a processing ambient including, consisting essentially of, or consisting of a vacuum or one or more inert gases, thereby forming a billet, and (iii) mechanically deforming the billet into wire having a diameter (or other dimension, e.g., width) less than a diameter (or other dimension, e.g., width) of the billet. Embodiments of the invention include three-dimensional objects or parts fabricated according to any of the above methods.

In another aspect, embodiments of the invention feature a three-dimensional part manufactured by additive manufacturing using a feedstock material that includes, consists essentially of, or consists of molybdenum. The part includes, consists essentially of, or consists of a plurality of layers. Each layer includes, consists essentially of, or consists of solidified molybdenum. The part is substantially free of gaps between successive layers and/or substantially free of gaps within one or more of the layers. The part is substantially free of cracks. The density of at least a portion of the three-dimensional part may be greater than 97% of a theoretical density of molybdenum, greater than 98% of a theoretical density of molybdenum, greater than 99% of a theoretical density of molybdenum, or greater than 99.5% of a theoretical density of molybdenum. The density of at least a portion of the three-dimensional part may be no greater than 100% of a theoretical density of molybdenum, no greater than 99.9% of a theoretical density of molybdenum, or no greater than 99.8% of a theoretical density of molybdenum. A concentration within the part of sodium, calcium, antimony, magnesium, phosphorous, and/or potassium may be less than 5 ppm by weight, less than 4 ppm by weight, less than 3 ppm by weight, less than 2 ppm by weight, or less than 1 ppm by weight. A concentration within the part of sodium, calcium, antimony, magnesium, phosphorous, and/or potassium may be no less than 0.001 ppm by weight, no less than 0.005 ppm by weight, no less than 0.01 ppm by weight, no less than 0.05 ppm by weight, no less than 0.1 ppm by weight, or no less than 0.5 ppm by weight.

Embodiments of the invention may include one or more of the following in any of a variety of combinations. A concentration within the part of each of sodium, calcium, antimony, magnesium, phosphorous, and potassium may be less than 5 ppm by weight, less than 4 ppm by weight, less than 3 ppm by weight, less than 2 ppm by weight, or less than 1 ppm by weight. A concentration within the part of each of sodium, calcium, antimony, magnesium, phosphorous, and potassium may be no less than 0.001 ppm by weight, no less than 0.005 ppm by weight, no less than 0.01 ppm by weight, no less than 0.05 ppm by weight, no less than 0.1 ppm by weight, or no less than 0.5 ppm by weight. A concentration of oxygen within the part may be less than 5 ppm by weight, less than 4 ppm by weight, less than 3 ppm by weight, less than 2 ppm by weight, or less than 1 ppm by weight. A concentration of oxygen within the part may be no less than 0.001 ppm by weight, no less than 0.005 ppm by weight, no less than 0.01 ppm by weight, no less than 0.05 ppm by weight, no less than 0.1 ppm by weight, no less than 0.5 ppm by weight, no less than 1 ppm by weight, or no less than 2 ppm by weight. The feedstock material may include, consist essentially of, or consist of wire. The feedstock material may include, consist essentially of, or consist of arc-melted wire (i.e., wire fabricated at least in part by arc melting). The feedstock material may include, consist essentially of, or consist of wire fabricated by a process that includes, consists essentially of, or consists of (i) compacting powder to form a feed electrode, the powder including, consisting essentially of, or consisting of molybdenum, (ii) arc-melting the feed electrode in a processing ambient including, consisting essentially of, or consisting of a vacuum or one or more inert gases, thereby forming a billet, and (iii) mechanically deforming the billet into wire having a diameter less than a diameter of the billet.

In an aspect, embodiments of the invention feature method of fabricating a three-dimensional part that includes, consists essentially of, or consists of a metallic material. In a step (a), powder is compacted to form a feed electrode. The powder includes, consists essentially of, or consists of the metallic material. In a step (b), the feed electrode is arc-melted in a processing ambient including, consisting essentially of, or consisting of a vacuum or one or more inert gases, thereby forming a billet. In a step (c), the billet is mechanically deformed into wire having a diameter (or other dimension, e.g., width) less than a diameter (or other dimension, e.g., width) of the billet. In a step (d), a tip of the wire is translated relative to a platform (i.e., all or a portion of the wire is translated, the platform is translated, or both). In a step (e), while the tip of the wire is being translated, the tip of the wire is melted with an energy source to form a molten bead, whereby the bead cools to form at least a portion of a layer of a three-dimensional part. In a step (f), steps (d) and (e) are repeated one or more times to produce the three-dimensional part (or at least a portion thereof). The three-dimensional part includes, consists essentially of, or consists of the metallic material.

Embodiments of the invention may include one or more of the following in any of a variety of combinations. The metallic material may include, consist essentially of, or consist of one or more refractory metals. The metallic material may include, consist essentially of, or consist of niobium, tantalum, rhenium, tungsten, and/or molybdenum.

The metallic material may include, consist essentially of, or consist of niobium, tantalum, rhenium, and/or tungsten. A concentration within the wire of sodium, calcium, antimony, magnesium, phosphorous, and/or potassium may be less than 5 ppm by weight, less than 4 ppm by weight, less than 3 ppm by weight, less than 2 ppm by weight, or less than 1 ppm by weight. A concentration within the wire of sodium, calcium, antimony, magnesium, phosphorous, and/or potassium may be no less than 0.001 ppm by weight, no less than 0.005 ppm by weight, no less than 0.01 ppm by weight, no less than 0.05 ppm by weight, no less than 0.1 ppm by weight, or no less than 0.5 ppm by weight. A concentration of oxygen within the wire may be less than 25 ppm by weight, less than 22 ppm by weight, less than 20 ppm by weight, less than 19 ppm by weight, less than 18 ppm by weight, less than 15 ppm by weight, or less than 10 ppm by weight. A concentration of oxygen within the wire may be no less than 0.001 ppm by weight, no less than 0.005 ppm by weight, no less than 0.01 ppm by weight, no less than 0.05 ppm by weight, no less than 0.1 ppm by weight, no less than 0.5 ppm by weight, no less than 1 ppm by weight, or no less than 2 ppm by weight. The density of at least a portion of the three-dimensional part may be greater than 97% of a theoretical density of the metallic material, greater than 98% of a theoretical density of the metallic material, greater than 99% of a theoretical density of the metallic material, or greater than 99.5% of a theoretical density of the metallic material. The density of at least a portion of the three-dimensional part may be no greater than 100% of a theoretical density of the metallic material, no greater than 99.9% of a theoretical density of the metallic material, or no greater than 99.8% of a theoretical density of the metallic material. Step (c) may include, consist essentially of, or consist of drawing, rolling, swaging, extruding, and/or pilgering. Step (a) may include sintering the compacted powder at a temperature greater than 900° C., greater than 950° C., greater than 1000° C., greater than 1100° C., or greater than 1200° C. Step (a) may include sintering the compacted powder at a temperature less than 3500° C., less than 3000° C., or less than 2500° C. In step (e), the energy source may include, consist essentially of, or consist of an electron beam and/or a laser beam. Prior to step (a), the powder may be provided by a process including, consisting essentially of, or consisting of plasma densification and/or plasma atomization. Prior to step (a), the powder may be provided by a process including, consisting essentially of, or consisting of (i) hydrogenating metal to form a metal hydride, (ii) mechanically grinding the metal hydride into a plurality of particles, and (iii) dehydrogenating the metal hydride particles. Embodiments of the invention include three-dimensional objects or parts fabricated according to any of the above methods.

In another aspect, embodiments of the invention feature a method of fabricating a three-dimensional part utilizing wire. The part includes, consists essentially of, or consists of a metallic material. The wire is produced by a process including, consisting essentially of, or consisting of (i) compacting powder to form a feed electrode, the powder including, consisting essentially of, or consisting of the metallic material, (ii) arc-melting the feed electrode in a processing ambient including, consisting essentially of, or consisting of a vacuum or one or more inert gases, thereby forming a billet, and (iii) mechanically deforming the billet into wire having a diameter (or other dimension, e.g., width) less than a diameter (or other dimension, e.g., width) of the billet. In a step (a), a tip of the wire is translated relative to a platform (i.e., all or a portion of the wire is translated, the platform is translated, or both). In a step (b), while the tip of the wire is being translated, the tip of the wire is melted with an energy source to form a molten bead, whereby the bead cools to form at least a portion of a layer of a three-dimensional part. In a step (c), steps (a) and (b) are repeated one or more times to produce at least a portion of the three-dimensional part. The three-dimensional part includes, consists essentially of, or consists of the metallic material.

Embodiments of the invention may include one or more of the following in any of a variety of combinations. The metallic material may include, consist essentially of, or consist of one or more refractory metals. The metallic material may include, consist essentially of, or consist of niobium, tantalum, rhenium, tungsten, and/or molybdenum. The metallic material may include, consist essentially of, or consist of niobium, tantalum, rhenium, and/or tungsten. A concentration within the wire of sodium, calcium, antimony, magnesium, phosphorous, and/or potassium may be less than 5 ppm by weight, less than 4 ppm by weight, less than 3 ppm by weight, less than 2 ppm by weight, or less than 1 ppm by weight. A concentration within the wire of sodium, calcium, antimony, magnesium, phosphorous, and/or potassium may be no less than 0.001 ppm by weight, no less than 0.005 ppm by weight, no less than 0.01 ppm by weight, no less than 0.05 ppm by weight, no less than 0.1 ppm by weight, or no less than 0.5 ppm by weight. A concentration of oxygen within the wire may be less than 25 ppm by weight, less than 22 ppm by weight, less than 20 ppm by weight, less than 19 ppm by weight, less than 18 ppm by weight, less than 15 ppm by weight, or less than 10 ppm by weight. A concentration of oxygen within the wire may be no less than 0.001 ppm by weight, no less than 0.005 ppm by weight, no less than 0.01 ppm by weight, no less than 0.05 ppm by weight, no less than 0.1 ppm by weight, no less than 0.5 ppm by weight, no less than 1 ppm by weight, or no less than 2 ppm by weight. The density of at least a portion of the three-dimensional part may be greater than 97% of a theoretical density of the metallic material, greater than 98% of a theoretical density of the metallic material, greater than 99% of a theoretical density of the metallic material, or greater than 99.5% of a theoretical density of the metallic material. The density of at least a portion of the three-dimensional part may be no greater than 100% of a theoretical density of the metallic material, no greater than 99.9% of a theoretical density of the metallic material, or no greater than 99.8% of a theoretical density of the metallic material. Mechanically deforming the billet into wire may include, consist essentially of, or consist of drawing, rolling, swaging, extruding, and/or pilgering. The process of producing the wire may include sintering the compacted powder at a temperature greater than 900° C., greater than 950° C., greater than 1000° C., greater than 1100° C., or greater than 1200° C. The process of producing the wire may include sintering the compacted powder at a temperature less than 3500° C., less than 3000° C., or less than 2500° C. In step (b), the energy source may include, consist essentially of, or consist of an electron beam and/or a laser beam. The process of producing the wire may include providing the powder by a process including, consisting essentially of, or consisting of plasma densification and/or plasma atomization. The process of producing the wire may include providing the powder by a process including, consisting essentially of, or consisting of (i) hydrogenating metal to form a metal hydride, (ii) mechanically grinding the metal hydride into a plurality of particles, and (iii) dehydrogenating the metal hydride particles. Embodiments of the invention include three-dimensional objects or parts fabricated according to any of the above methods.

In yet another aspect, embodiments of the invention feature a method of fabricating a three-dimensional part that includes, consists essentially of, or consists of a metallic material. In a step (a), a wire including, consisting essentially of, or consisting of arc-melted metallic material is provided. In a step (b), a tip of the wire is translated relative to a platform (i.e., all or a portion of the wire is translated, the platform is translated, or both). In a step (c), while the tip of the wire is being translated, the tip of the wire is melted with an energy source to form a molten bead, whereby the bead cools to form at least a portion of a layer of a three-dimensional part. In a step (d), steps (b) and (c) are repeated one or more times to produce at least a portion of the three-dimensional part. The three-dimensional part includes, consists essentially of, or consists of the metallic material.

Embodiments of the invention may include one or more of the following in any of a variety of combinations. The metallic material may include, consist essentially of, or consist of one or more refractory metals. The metallic material may include, consist essentially of, or consist of niobium, tantalum, rhenium, tungsten, and/or molybdenum. The metallic material may include, consist essentially of, or consist of niobium, tantalum, rhenium, and/or tungsten. A concentration within the wire of sodium, calcium, antimony, magnesium, phosphorous, and/or potassium may be less than 5 ppm by weight, less than 4 ppm by weight, less than 3 ppm by weight, less than 2 ppm by weight, or less than 1 ppm by weight. A concentration within the wire of sodium, calcium, antimony, magnesium, phosphorous, and/or potassium may be no less than 0.001 ppm by weight, no less than 0.005 ppm by weight, no less than 0.01 ppm by weight, no less than 0.05 ppm by weight, no less than 0.1 ppm by weight, or no less than 0.5 ppm by weight. A concentration of oxygen within the wire may be less than 25 ppm by weight, less than 22 ppm by weight, less than 20 ppm by weight, less than 19 ppm by weight, less than 18 ppm by weight, less than 15 ppm by weight, or less than 10 ppm by weight. A concentration of oxygen within the wire may be no less than 0.001 ppm by weight, no less than 0.005 ppm by weight, no less than 0.01 ppm by weight, no less than 0.05 ppm by weight, no less than 0.1 ppm by weight, no less than 0.5 ppm by weight, no less than 1 ppm by weight, or no less than 2 ppm by weight. The density of at least a portion of the three-dimensional part may be greater than 97% of a theoretical density of the metallic material, greater than 98% of a theoretical density of the metallic material, greater than 99% of a theoretical density of the metallic material, or greater than 99.5% of a theoretical density of the metallic material. The density of at least a portion of the three-dimensional part may be no greater than 100% of a theoretical density of the metallic material, no greater than 99.9% of a theoretical density of the metallic material, or no greater than 99.8% of a theoretical density of the metallic material. In step (c), the energy source may include, consist essentially of, or consist of an electron beam and/or a laser beam. The process of producing the wire may include, consist essentially of, or consist of (i) compacting powder to form a feed electrode, the powder including, consisting essentially of, or consisting of the metallic material, (ii) arc-melting the feed electrode in a processing ambient including, consisting essentially of, or consisting of a vacuum or one or more inert gases, thereby forming a billet, and (iii) mechanically deforming the billet into wire having a diameter (or other dimension, e.g., width) less than a diameter (or other dimension, e.g., width) of the billet. Embodiments of the invention include three-dimensional objects or parts fabricated according to any of the above methods.

In another aspect, embodiments of the invention feature a three-dimensional part manufactured by additive manufacturing using a feedstock material that includes, consists essentially of, or consists of a metallic material. The part includes, consists essentially of, or consists of a plurality of layers. Each layer includes, consists essentially of, or consists of solidified metallic material. The part is substantially free of gaps between successive layers and/or substantially free of gaps within one or more of the layers. The part is substantially free of cracks. The density of at least a portion of the three-dimensional part may be greater than 97% of a theoretical density of the metallic material, greater than 98% of a theoretical density of the metallic material, greater than 99% of a theoretical density of the metallic material, or greater than 99.5% of a theoretical density of the metallic material. The density of at least a portion of the three-dimensional part may be no greater than 100% of a theoretical density of the metallic material, no greater than 99.9% of a theoretical density of the metallic material, or no greater than 99.8% of a theoretical density of the metallic material. A concentration within the part of sodium, calcium, antimony, magnesium, phosphorous, and/or potassium may be less than 5 ppm by weight, less than 4 ppm by weight, less than 3 ppm by weight, less than 2 ppm by weight, or less than 1 ppm by weight. A concentration within the part of sodium, calcium, antimony, magnesium, phosphorous, and/or potassium may be no less than 0.001 ppm by weight, no less than 0.005 ppm by weight, no less than 0.01 ppm by weight, no less than 0.05 ppm by weight, no less than 0.1 ppm by weight, or no less than 0.5 ppm by weight.

Embodiments of the invention may include one or more of the following in any of a variety of combinations. The metallic material may include, consist essentially of, or consist of one or more refractory metals. The metallic material may include, consist essentially of, or consist of niobium, tantalum, rhenium, tungsten, and/or molybdenum. The metallic material may include, consist essentially of, or consist of niobium, tantalum, rhenium, and/or tungsten. A concentration within the part of each of sodium, calcium, antimony, magnesium, phosphorous, and potassium may be less than 5 ppm by weight, less than 4 ppm by weight, less than 3 ppm by weight, less than 2 ppm by weight, or less than 1 ppm by weight. A concentration within the part of each of sodium, calcium, antimony, magnesium, phosphorous, and potassium may be no less than 0.001 ppm by weight, no less than 0.005 ppm by weight, no less than 0.01 ppm by weight, no less than 0.05 ppm by weight, no less than 0.1 ppm by weight, or no less than 0.5 ppm by weight. A concentration of oxygen within the part may be less than 5 ppm by weight, less than 4 ppm by weight, less than 3 ppm by weight, less than 2 ppm by weight, or less than 1 ppm by weight. A concentration of oxygen within the part may be no less than 0.001 ppm by weight, no less than 0.005 ppm by weight, no less than 0.01 ppm by weight, no less than 0.05 ppm by weight, no less than 0.1 ppm by weight, no less than 0.5 ppm by weight, no less than 1 ppm by weight, or no less than 2 ppm by weight. The feedstock material may include, consist essentially of, or consist of wire. The feedstock material may include, consist essentially of, or consist of arc-melted wire (i.e., wire fabricated at least in part by arc melting). The feedstock material may include, consist essentially of, or consist of wire fabricated by a process that includes, consists essentially of, or consists of (i) compacting powder to form a feed electrode, the powder including, consisting essentially of, or consisting of the metallic material, (ii) arc-melting the feed electrode in a processing ambient including, consisting essentially of, or consisting of a vacuum or one or more inert gases, thereby forming a billet, and (iii) mechanically deforming the billet into wire having a diameter less than a diameter of the billet.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the terms "approximately" and "substantially" mean±10%, and in some embodiments, ±5%. The term "consists essentially of" means excluding other materials that contribute to function, unless otherwise defined herein. Nonetheless, such other materials may be present, collectively or individually, in trace amounts. For example, a structure consisting essentially of multiple metals will generally include only those metals and only unintentional impurities (which may be metallic or non-metallic) that may be detectable via chemical analysis but do not contribute to function. As used herein, "consisting essentially of at least one metal" refers to a metal or a mixture of two or more metals but not compounds between a metal and a non-metallic element or chemical species such as oxygen, silicon, or nitrogen (e.g., metal nitrides, metal silicides, or metal oxides); such non-metallic elements or chemical species may be present, collectively or individually, in trace amounts, e.g., as impurities.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

In accordance with various embodiments of the invention, a billet of the desired metallic precursor material is formed via compacting powder including, consisting essentially of, or consisting of the precursor material (e.g., one or more refractory metals) into a rod or other three-dimensional structure. The powders themselves may be initially formed utilizing one or more techniques that minimize or substantially reduce the amount of oxygen and other volatile elements within the powders. In this manner, the amount of such volatile species within the wire is minimized or reduced. For example, various powders may be formed and/or treated via a hydride/dehydride process, plasma densification, and/or plasma atomization, and the powders may have low concentrations of volatile species such as oxygen (e.g., oxygen contents lower than 300 ppm, lower than 100 ppm, lower than 50 ppm, or even lower than 30 ppm). As known in the art, hydride/dehydride processes involve the embrittlement of a metal via hydrogen introduction (thereby forming a hydride phase), followed by mechanical grinding (e.g., ball milling) and dehydrogenation (e.g., heating in a vacuum). Various powders or powder precursors may even be combined with one or more materials (e.g., metals) having a higher affinity for oxygen (e.g., calcium, magnesium, etc.), deoxidized at high temperature, and then separated from the high-oxygen-affinity material via, e.g., chemical leaching, as detailed in U.S. Pat. No. 6,261,337, filed on Aug. 19, 1999 (the '337 patent), the entire disclosure of which is incorporated by reference herein. As described in U.S. patent application Ser. No. 15/416,253, filed on Jan. 27, 2017, the entire disclosure of which is incorporated by reference herein, in a plasma densification process, metal particulates are fed into a plasma jet or plasma torch, at least partially melted thereby, and upon cooling tend to have a substantially spherical morphology. The plasma densification process may also reduce the concentrations of volatile elements within the metal powder.

Figure 1:
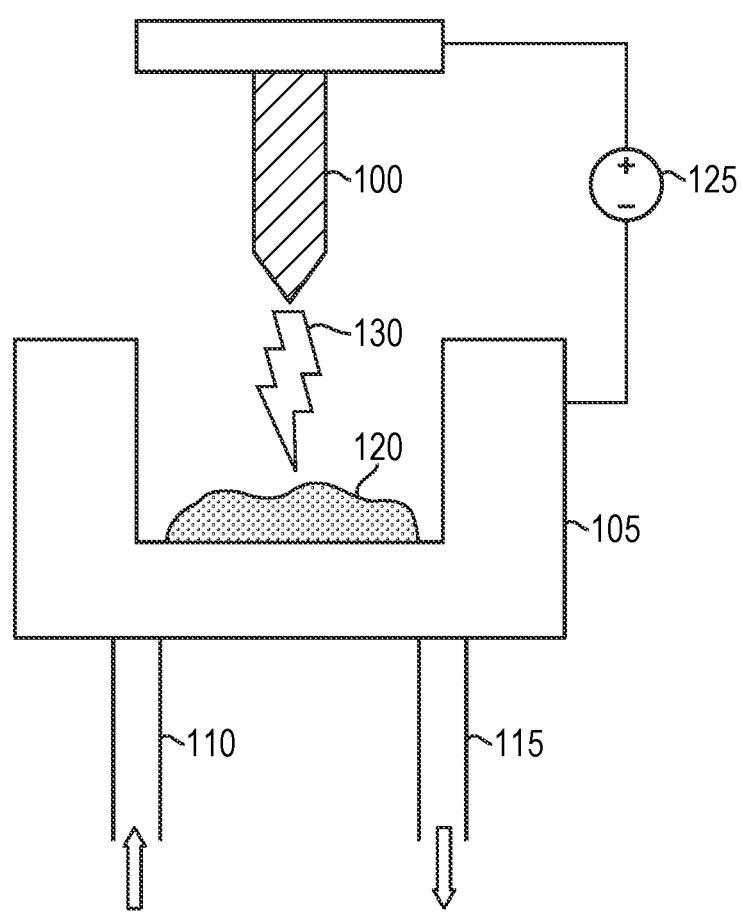
FIG. 1 is a schematic cross-sectional view of an arc-melting apparatus utilized to form metallic billets in accordance with various embodiments of the invention.

The compacted-powder rod may then be sintered to form a feed electrode for an arc-melting process. For example, the rod may be sintered at a temperature ranging from approximately 1800° C. to approximately 2200° C. As illustrated in FIG. 1, the feed electrode 100 is typically placed over a crucible 105 (which may include, consist essentially of, or consist of, e.g., copper) that may be cooled via flow of coolant (e.g., water or other heat-exchange fluid) circulating within and/or around the crucible 105. As shown, the coolant may flow from a cooling inlet 110 and out of the crucible 105 via a cooling outlet 115. In various embodiments, a small charge 120 of the precursor material is positioned at the bottom of the crucible 105, and an electric current (e.g., hundreds, or even thousands of Amperes of DC current) is applied between the charge 120 and the feed electrode 100. The electrical current, which may be applied by a power supply 125, creates an arc 130 between the feed electrode 100 and the charge 120 within crucible 105, causing the feed electrode 100 to melt, forming a billet having the shape of the interior of the crucible 105 (e.g., round and at least partially cylindrical). A vacuum or other inert atmosphere (e.g., nitrogen gas, argon gas, or other inert gas) may be present within and/or around the crucible 105, and various volatile impurities within the feed electrode 100 may escape into that ambient during the arc melting. The resulting billet may even be subjected to arc melting one or more additional times in order to refine the billet material and further reduce the concentration of various volatile impurities.

Figure 2:
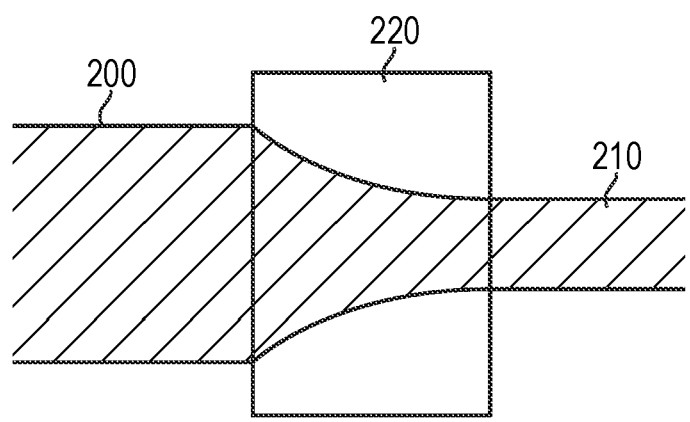
FIG. 2 is a schematic view of a wire being fabricated from a metallic rod or billet in accordance with various embodiments of the invention.

After the arc-melting process, the resulting billet is crafted into wire by one or more mechanical deformation processes. For example, the billet may be hot worked (e.g., extruded, rolled, forged, pilgered, etc.) to form a rod having a diameter smaller than that of the initial billet. The billet and/or the rod may be further densified by pressing, e.g., cold isostatic pressing or hot isostatic pressing. The rod may then be formed into a wire having the final desired diameter by, e.g., one or more of drawing, swaging, pilgering, extrusion, etc. (In various embodiments, the immediate product of the arc-melting process, i.e., the billet, may be formed into a wire directly, rather than being formed into a rod therebetween.) In an exemplary embodiment depicted in FIG. 2, the rod 200 is formed into wire 210 via drawing through one or more drawing dies 220 until the diameter of the wire 210 is reduced to the desired dimension. In various embodiments, the drawing is supplemented with or replaced by one or more other mechanical deformation processes that reduce the diameter (or other lateral dimension) of the rod 200, e.g., pilgering, rolling, swaging, extrusion, etc. The rod 200 and/or wire 210 may be annealed during and/or after diameter reduction (e.g., drawing). The billet, rod, and/or wire may be heat treated during and/or after diameter reduction. For example, the billet, rod, and/or wire may be sintered at a temperature greater than 900° C.

Figure 3:
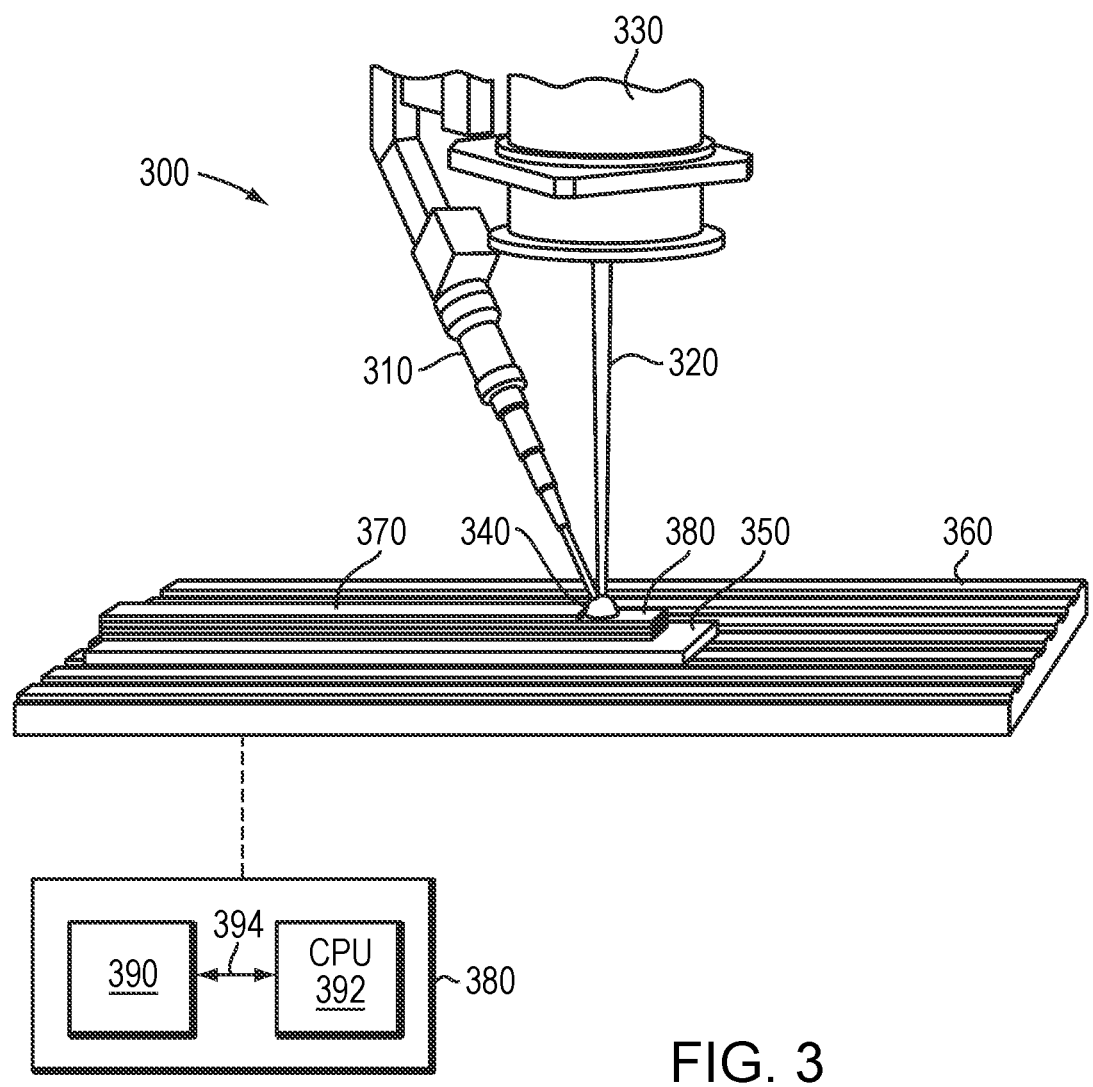
FIG. 3 is a schematic of an additive-manufacturing apparatus utilized to fabricate three-dimensional metallic parts in accordance with various embodiments of the invention.

Once wire 210 including, consisting essentially of, or consisting of one or refractory metals (e.g., molybdenum) is fabricated in accordance with embodiments of the invention, the wire 210 may be utilized to fabricate a three-dimensional part with an additive manufacturing assembly 300. For example, as shown in FIG. 3, the wire 210 may be incrementally fed, using a wire feeder 310, into the path of a high-energy source 320 (e.g., an electron beam or a laser beam emitted by a laser or electron-beam source 330), which melts the tip of the wire 230 to form a small molten pool (or "bead" or "puddle") 340. The entire assembly 300 may be disposed within a vacuum chamber to prevent or substantially reduce contamination from the ambient environment.

Relative movement between a substrate 350 (which may be, as shown, disposed on a platform 360) supporting the deposit and the wire/gun assembly results in the part being fabricated in a layer-by-layer fashion. Such relative motion results in the continuous formation of a layer 370 of the three-dimensional object from continuous formation of molten pool 340 at the tip of the wire 230. As shown in FIG. 3, all or a portion of layer 370 may be formed over one or more previously formed layers 380. The relative movement (i.e., movement of the platform 360, the wire/gun assembly, or both) may be controlled by a computer-based controller 380 based on electronically stored representations of the part to be fabricated. For example, the two-dimensional layers traced out by the melting wire may be extracted from a stored three-dimensional representation of the final part stored in a memory 390.

The computer-based control system (or "controller") 380 in accordance with embodiments of the present invention may include or consist essentially of a general-purpose computing device in the form of a computer including a processing unit (or "computer processor") 392, the system memory 390, and a system bus 394 that couples various system components including the system memory 390 to the processing unit 392. Computers typically include a variety of computer-readable media that can form part of the system memory 390 and be read by the processing unit 392. By way of example, and not limitation, computer readable media may include computer storage media and/or communication media. The system memory 390 may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit 392. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Any suitable programming language may be used to implement without undue experimentation the functions described herein. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of systems and techniques of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 392 that executes commands and instructions may be a general-purpose computer processor, but may utilize any of a wide variety of other technologies including special-purpose hardware, a microcomputer, minicomputer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of embodiments of the invention.

Advantageously, wires in accordance with embodiments of the invention contain reduced or minimal amounts (if any) of volatile elements such as O, Na, Mg, P, S, K, Ca, and Sb, and therefore the wire 210 melts during additive manufacturing with little if any sparking and without introducing porosity, cracks, or other defects into the printed part. After the additive manufacturing process is complete, the part may be removed from the platform and subjected to final machining and/or polishing.

Example 1

A Mo wire (wire A) having an outer diameter of 0.062 inches was fabricated in accordance with embodiments of the present invention. Specifically, wire A was produced by (1) compaction of Mo powder having purity of 99.95% into a rod, (2) sintering of the rod to form a feed electrode, (3) arc melting of the feed electrode under vacuum within a water-cooled copper crucible to form a billet, and (4) hot working of the billet in order to reduce its diameter. For comparison, a control Mo wire (wire B) having an outer diameter of 0.062 inches was fabricated via conventional powder-metallurgy techniques. Specifically, wire B was produced by (1) compaction of Mo powder having purity of 99.95% into a billet, (2) sintering the billet in a hydrogen atmosphere to a density of at least 93%, and (3) hot working of the billet in order to reduce its diameter. Detailed compositional information for various impurity species in both wires was obtained via glow discharge mass spectrometry (GDMS) and is presented in Table 1.

TABLE 1

| Element | Composition in Wire A (ppm) | Composition in Wire B (ppm) |
| --- | --- | --- |
| Na | 0.1 | 21 |
| Mg | 0.04 | 5.8 |
| Si | 5 | 34 |
| P | 0.97 | 3.6 |
| K | 0.06 | 2.4 |
| Ca | 0.53 | 21 |
| Sb | 0.67 | 18 |
| O | 18 | 28 |

As shown in Table 1, wire A contained significantly less of several volatile impurities than wire B.

Example 2

Wires A and B from Example 1 were utilized in an exemplary additive manufacturing process to fabricate a three-dimensional Mo part. Each wire was heated to melting during the fabrication process via an electron beam having an average power of 35 kV at 110 mA (pulsed). The wire feed speed into the electron beam was approximately 30 in/min, and the relative travel speed between the wire and the fabrication platform was 10 in/min. The deposition rate was approximately 0.91 kg/hr.

Figure 4:
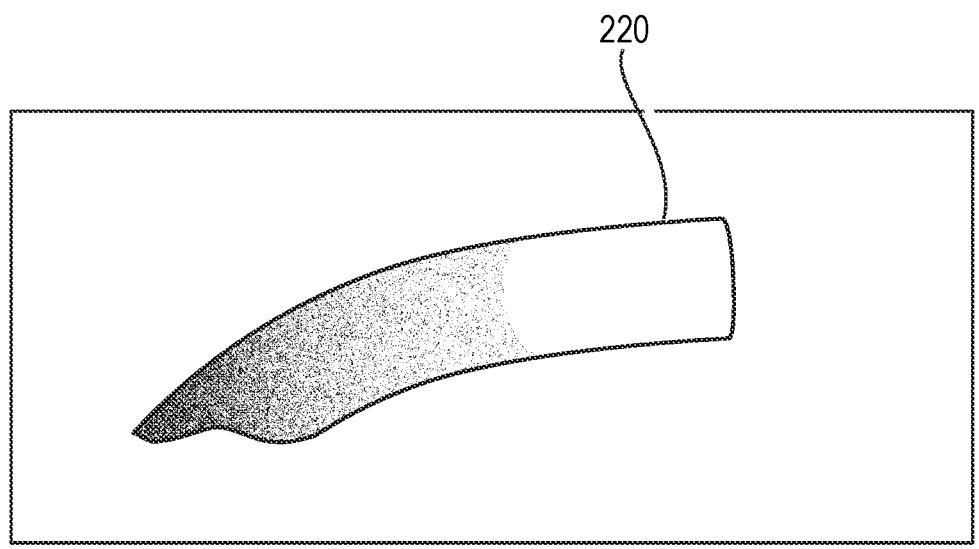
FIG. 4 is an image of the tip a wire fabricated in accordance with various embodiments of the invention during an additive manufacturing process.
Figure 5:
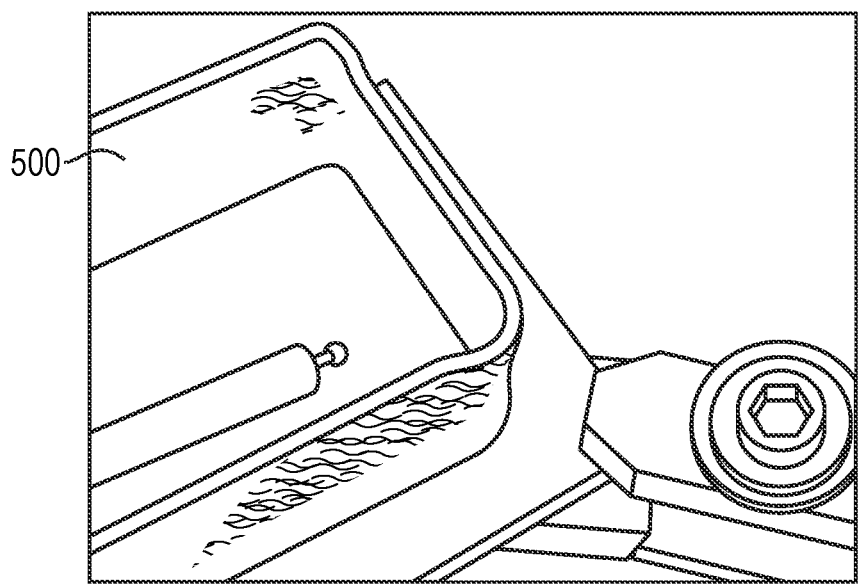
FIG. 5 is an image of a three-dimensional part fabricated by additive manufacturing utilizing the wire of FIG. 4.
Figure 6:
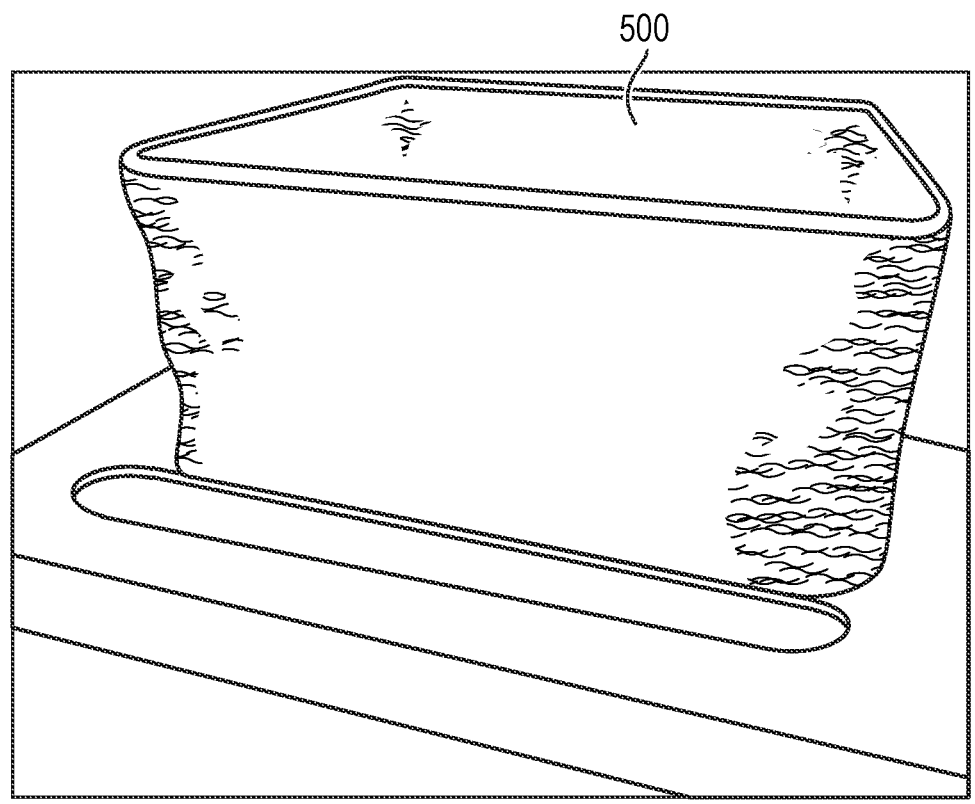
FIG. 6 is an image of the part of FIG. 5 after machining.

During fabrication using wire A, the deposition was smooth and substantially free of sparking, blistering, and splattering. FIG. 4 is an image of the molten bead 400 forming at the tip of wire A during the additive manufacturing process. FIG. 5 is an image of the resulting part 500 manufactured utilizing wire A. As shown, the part 500 is free of visible cracks or other imperfections, and the fabrication platform is free of visible splatter or other debris. As shown in FIG. 6, the part 500 could be machined and/or polished, in to remove any roughness resulting from the layer-by-layer fabrication process, without cracking or other damage.

Figure 7:
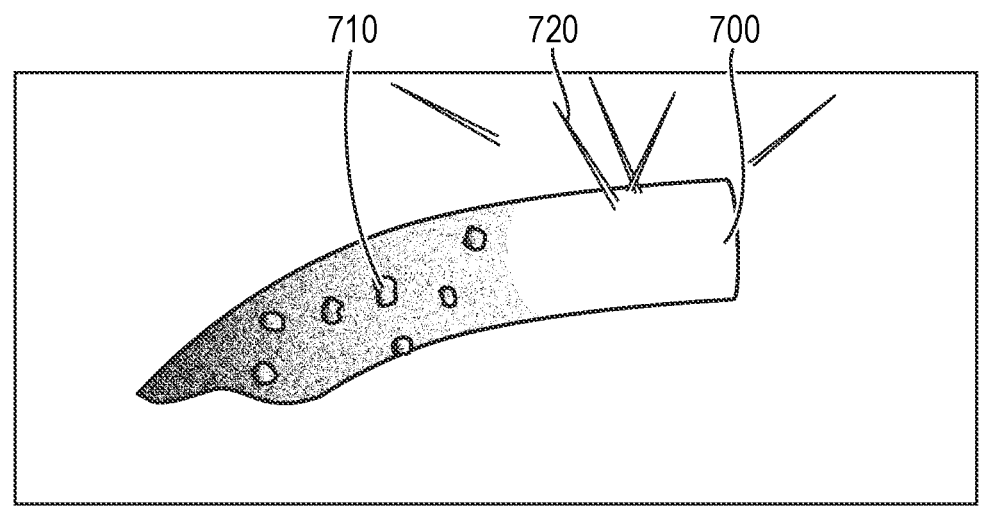
FIG. 7 is an image of the tip of a conventional wire during an additive manufacturing process.
Figure 8A:
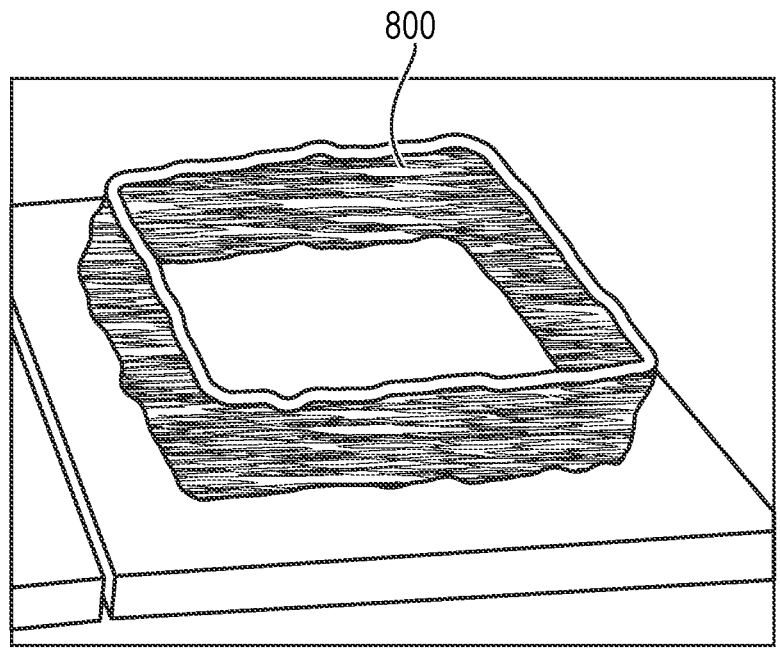
FIGS. 8A and 8B are images of a three-dimensional part fabricated by additive manufacturing utilizing the wire of FIG. 7.
Figure 8B:
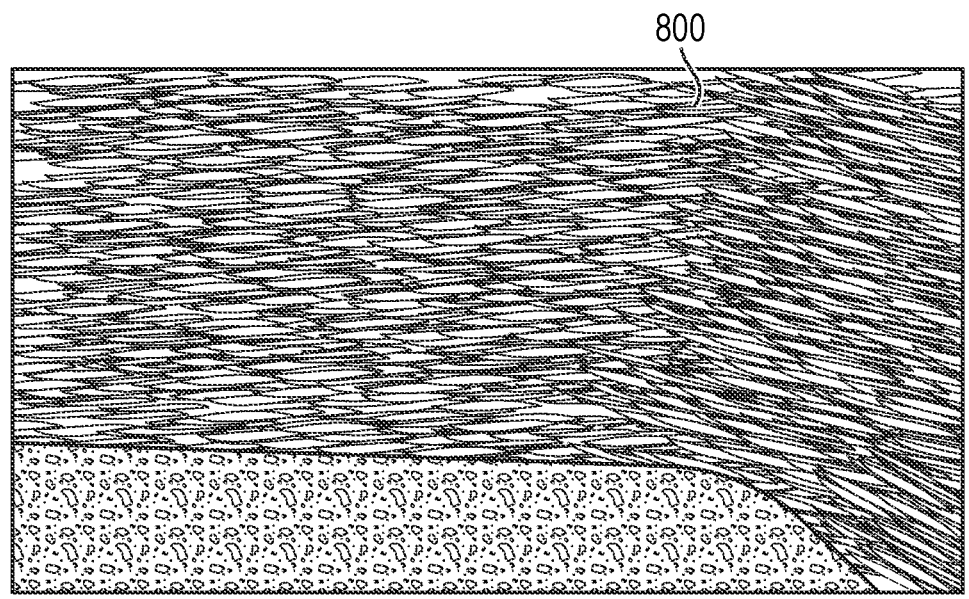

During fabrication using wire B, the deposition was plagued by sparking and blistering. FIG. 7 depicts the molten bead 700 forming at the tip of wire B during the additive manufacturing process. As shown, wire B possessed a large number of pores or inclusions 710 due to, e.g., the higher concentration of volatile impurities within wire B. In addition, visible sparks 720 from wire B resulted during the melting and fabrication process. FIGS. 8A and 8B are images of the three-dimensional part 800 fabricated utilizing wire B. As shown, part 800 had visible cracking in its walls, and there was visible splattering of the wire material on the fabrication platform and on the part 800 itself. Attempted machining of part 800 was unsuccessful, and part 800 was unsatisfactory for use as a crucible, in stark contrast to part 500.

The densities of the finished parts 500, 800 were measured, and the results are presented in Table 2 below.

TABLE 2

| Part/Location within part | Density (g/cc) | % of Theoretical Density |
| --- | --- | --- |
| 500/Top of wall | 10.13 | 99.1 |
| 500/Bottom of wall | 10.14 | 99.2 |
| 800/Top of wall | 9.73 | 95.2 |
| 800/Middle of wall | 9.81 | 96.0 |
| 800/Bottom of wall | 9.75 | 95.4 |

As shown, the part 500 fabricated using wire A had a density much higher than that of the part 800 fabricated using wire B. In addition, compositional analysis of the fabricated parts 500, 800 was performed by GDMS, and the results are shown in Table 3 below.

TABLE 3

| Element | Composition in Part 500 (ppm) | Composition in Part 800 (ppm) |
| --- | --- | --- |
| Na | 0.01 | 2.4 |
| Mg | 0.08 | 0.21 |
| Si | 12 | 31 |
| P | 0.27 | 1 |
| K | 0.07 | 1.8 |
| Ca | 0.06 | 1.2 |
| Sb | 0.09 | 1.3 |
| O | <5 (less than detection limit) | 5.5 |

As shown in Table 3, the concentrations of most of the impurity elements decreased during the fabrication process, presumably due to melting of the wire and volatilization of the impurities. However, the part 500 fabricated utilizing wire A had concentrations of these impurities that were much lower than those in the part 800 fabricated utilizing wire B. In addition, even though the amounts of these impurity elements within the part 800 fabricated utilizing wire B tended to be lower than the impurity levels within wire B itself, the part 800 fabricated utilizing wire B had unacceptable morphology and density, and was accompanied by splatter and sparking during fabrication, as shown in FIGS. 8A and 8B and discussed above.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of fabricating a three-dimensional part comprising a metallic material, the method comprising:
 (a) providing a wire comprising arc-melted metallic material, wherein the wire is produced by a process comprising (i) in a processing ambient comprising a vacuum or one or more inert gases, arc-melting a feed electrode comprising the metallic material to thereby form a billet, and (ii) mechanically deforming the billet into wire having a diameter less than a diameter of the billet;

(b) translating a tip of the wire relative to a platform;

(c) while the tip of the wire is being translated, melting the tip of the wire with an energy source to form a molten bead, whereby the bead cools to form at least a portion of a layer of a three-dimensional part; and (d) repeating steps (b) and (c) one or more times to produce the three-dimensional part, wherein the three-dimensional part comprises the metallic material.

2. The method of claim 1, wherein the metallic material comprises at least one of niobium, tantalum, rhenium, tungsten, or molybdenum.

3. The method of claim 1, wherein a concentration within the wire of at least one of sodium, calcium, antimony, magnesium, phosphorous, or potassium is less than 5 ppm by weight.

4. The method of claim 1, wherein a concentration of oxygen within the wire is less than 20 ppm by weight.

5. The method of claim 1, wherein a density of the three-dimensional part is greater than 97% of a theoretical density of the metallic material.

6. The method of claim 1, wherein in step (c) the energy source comprises an electron beam and/or a laser beam.

7. A method of fabricating a three-dimensional part comprising a metallic material, the method comprising:

(a) providing a wire comprising arc-melted metallic material;

(b) translating a tip of the wire relative to a platform;

(c) while the tip of the wire is being translated, melting the tip of the wire with an energy source to form a molten bead, whereby the bead cools to form at least a portion of a layer of a three-dimensional part; and (d) repeating steps (b) and (c) one or more times to produce the three-dimensional part, wherein the three-dimensional part comprises the metallic material, and the wire is produced by a process comprising:

compacting powder to form a feed electrode, the powder comprising the metallic material;

arc-melting the feed electrode in a processing ambient comprising a vacuum or one or more inert gases, thereby forming a billet; and mechanically deforming the billet into wire having a diameter less than a diameter of the billet.

8. The method of claim 7, wherein the metallic material comprises at least one of niobium, tantalum, rhenium, tungsten, or molybdenum.

9. The method of claim 7, wherein a concentration within the wire of at least one of sodium, calcium, antimony, magnesium, phosphorous, or potassium is less than 5 ppm by weight.

10. The method of claim 7, wherein a concentration of oxygen within the wire is less than 20 ppm by weight.

11. The method of claim 7, wherein a density of the three-dimensional part is greater than 97% of a theoretical density of the metallic material.

12. The method of claim 7, wherein in step (c) the energy source comprises an electron beam and/or a laser beam.

13. The method of claim 7, wherein mechanically deforming the billet comprises at least one of drawing, rolling, swaging, extruding, or pilgering.

14. The method of claim 7, wherein the wire-production process comprises sintering the compacted powder at a temperature greater than 900° C.

15. The method of claim 7, wherein the wire-production process comprises providing the powder by a process comprising at least one of plasma densification or plasma atomization.

16. The method of claim 7, wherein the wire-production process comprises:

hydrogenating metal to form a metal hydride;

mechanically grinding the metal hydride into a plurality of particles; and dehydrogenating the metal hydride particles.

17. The method of claim 1, wherein mechanically deforming the billet comprises at least one of drawing, rolling, swaging, extruding, or pilgering.

* * * * *